United States Patent [19]

Batting

[11] Patent Number: 4,582,220
[45] Date of Patent: Apr. 15, 1986

[54] CONSTRUCTION FOR GAS METER COVER

[75] Inventor: Robert D. Batting, Bridgeport, Conn.

[73] Assignee: Sangamo Weston, Inc., Atlanta, Ga.

[21] Appl. No.: 747,457

[22] Filed: Jun. 21, 1985

[51] Int. Cl.⁴ .............................................. B65D 51/16
[52] U.S. Cl. ................................. 220/367; 220/82 R; 220/377; 73/273
[58] Field of Search .................. 220/82 R, 82 A, 367, 220/377; 137/587, 588; 73/273

[56] References Cited

U.S. PATENT DOCUMENTS 2,647,404  8/1953  Whitworth ..................... 220/82 R
2,738,672  3/1956  Smith et al. ..................... 220/82 A Primary Examiner—George T. Hall
Attorney, Agent, or Firm—Robert J. Doherty

[57] ABSTRACT

A gas meter in which the index and register thereof is directly housed within the main gas chamber of the meter itself. An integrally molded plastic cover which is visually transparent provides the means for mounting the index and in part forms the gas chamber. The index register is visible through the cover.

8 Claims, 3 Drawing Figures

CONSTRUCTION FOR GAS METER COVER

BACKGROUND AND OBJECTS OF THE INVENTION

This invention is directed to gas meters and more particularly to an improved cover construction for a curb meter body. These meters are generally mounted either on the outside wall of a building or home or in a small underground pit at the curb hence their reference as being curb meters. Generally such meters are constructed of an all metal fireproof envelope which defines an interior gas chamber even though the danger of such meters being subjected to fire damage is remote because of their outside and generally underground locations. Typical of such constructions is that described in U.S. Pat. No. 2,647,404 to Whitworth issued Aug. 4, 1953 and assigned to Sprague Meter Company, Bridgeport, Conn. In such patent a meter top of cast iron construction cooperates with a cast iron meter body (not shown) to form an interior gas chamber. A driving mechanism for the meter index extends into the gas chamber so as to require a stuffing box seal such that gas does not escape into a secondary compartment in which a gas index including a register is housed. Such secondary housing includes various sealant means by which a transparent cover enables the register to be observed for reading, etc.

Inasmuch as meters of this type are normally housed outside and generally underground, moisture often penetrates into the secondary compartment and causes fogging, condensation, and the like such that the register is difficult to read. When confronted with such a situation, meter readers are not able to obtain a reading thus causing difficulty to the gas company owning and maintaining such meter.

It would be advantageous to provide a modified cover construction such that when utilized in cooperation with already existing gas meter bodies, the troublesome problem of moisture condensation is eliminated in curb meter constructions. Such is an overall objective of the present invention.

Another drawback of existing meter constructions is that they require a number of gaskets, screws, and other sealing mechanisms in order to house the index means in a separate compartment. This requires the gas company owning and maintaining such meters to not only undergo the expense of repair when necessary but also bear the various cost associated with maintaining an inventory of a variety of sealing components. Accordingly, an objective of the present invention is the elimination of such drawbacks associated with the attempted sealing of secondary compartments in which gas index means are housed.

These and other objectives of the present invention are accomplished by entirely eliminating the secondary compartment for the gas meter and mounting the gas index directly and completely inside the interior compartment through which gas flows and, in addition, providing a cover the top wall of which is transparent or at least translucent such that the gas index may be directly viewed therethrough. This unexpected approach and the attendant improved results therefrom is possible with gas meter constructions mounted in a position where fire attack is unlikely, i.e., curb meters, and such term will be used hereinafter for gas and other flow meters mounted in such locations.

In addition by eliminating these gaskets, boot seals, etc., potential gas leak paths through such gaskets, seals, etc. are also eliminated thus resulting in a consequent safety improvement. Further by locating the index inside the housing, the index is rendered inaccessible and thus tamper resistant to those considering gas theft by altering the index. In addition, any condensation problem associated with the index is also eliminated since the flow of the gas through the housing will remove any moisture.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DETAILED DESCRIPTION OF THE INVENTION

Figure 1:
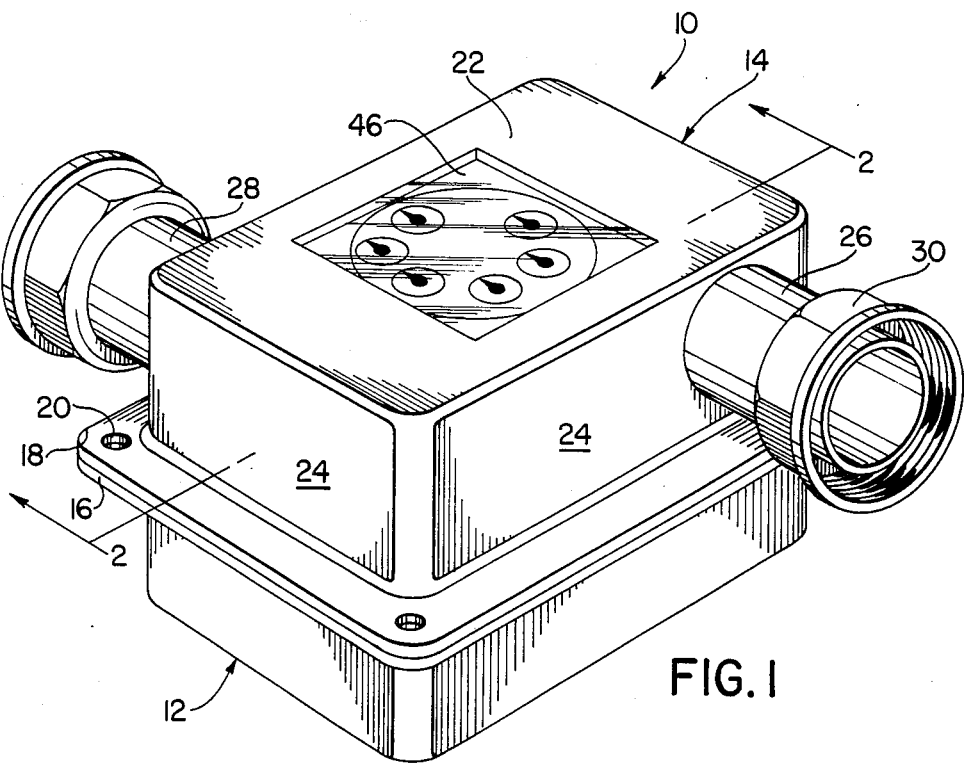
FIG. 1 is a perspective view of a cover construction of the present invention mounted upon a gas meter body.
Figure 2:
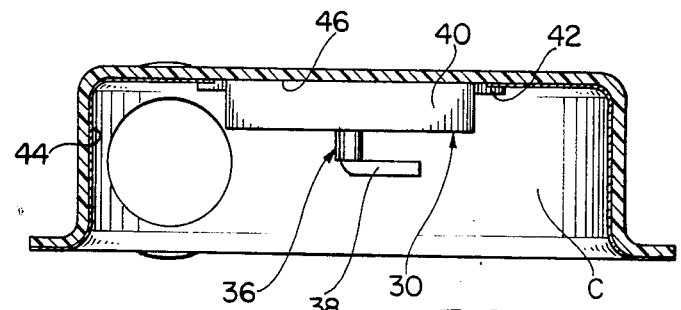
FIG. 2 is a side sectional view of the cover portion of the meter shown in FIG. 1.
Figure 3:
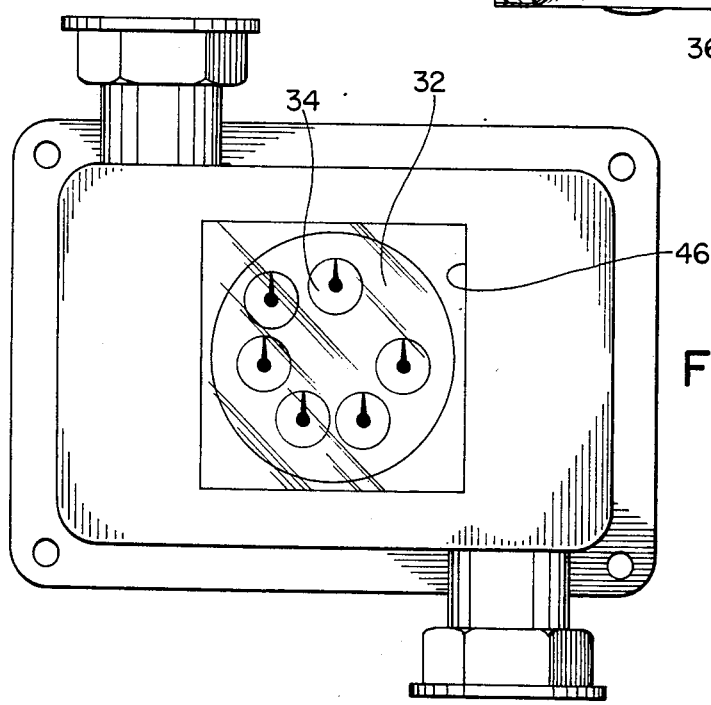
FIG. 3 is a top plan view thereof.

Turning now to the drawing and particularly FIG. 1 thereof, a gas meter 10 is shown having a conventional body 12 generally formed from cast iron and normally of rectilinear configuration although not necessarily so. The cover 14 of the present invention is adapted to sealingly engage the body 12 as through cooperating opposed peripheral body and cover flanges 16, 18 respectively. Normally a gasket or other sealing mechanism is disposed between the opposed flanges and the flanges drawn together by suitable bolts (not shown) through openings 20.

Although the exact shape of the cover 14 forms no part of the present invention, it should be pointed out that such shape is to some extent dictated by the shape of the body 12 with which it cooperates. Accordingly, the drawing depicts a cover 14 of solid rectangular configuration although other configurations are possible. The cover is formed integrally as by casting or injection molding techniques from engineered plastic resinous material such as ABS, polycarbonates, and the like. It is necessary that such material enable the interior portions of the gas meter to be visible; and, accordingly, the resinous material selected preferably should be inherently transparent or at least translucent and flame retardant.

Such cover 14 includes a top wall 22 of generally planar construction from which sidewalls 24 downwardly extend from the periphery thereof. The lower peripheral portions of the sidewalls 24 terminate in a laterally outwardly extending peripheral flange 18 as aforementioned. One of the sidewalls includes a gas inlet pipe 26 while the sidewall opposite thereto includes a exit pipe 28. A suitable fixture 30 is mounted to such pipes 26, 28 for attachment to a conventional gas supply line (not shown). Alternatively, the opposed side walls may be provided with openings (not shown) for receipt of the inlet and exit pipes 26, 28. Also it is possible that the inlet and exit pipes maya be mounted through the top wall 22 or a combination of top and sidewalls or even through the body 12 of the meter 10.

Alternatively the pipes 26, 28 may simply be eliminated and the fixtures 30 molded integrally with the housing, i.e., projecting from opposed walls 24. The essential thing is that the cover 14 and the body 12 cooperatively form a interior chamber C through which gas flows such that a conventional gas index is activated by such flow and such flow recorded in the register portion thereof.

The gas index 30 may be of conventional construction similar to that shown in U.S. Pat. No. 2,647,404, the disclosure of which is hereby incorporated into this specification by specific reference and includes a register portion 32 including either numerical dials 34 as shown or a digital readout (not shown). As a driving mechanism 36 for the register is provided which in turn further includes a paddle member 38 which is revolved by the gas flow and, accordingly, activates the conventional internal mechanisms of the register 32. The index 30 is shown within a housing 40 which housing includes outwardly extending tabs 42 which in turn are glued or otherwise attached directly to the inside surface of the top wall 22. Screws, bolts, and the like could also be utilized. Inasmuch as the top wall is transparent or translucent, the dials or digital readout of the register 32 are directly visible through the top wall. In this regard, portions of the inside surface of the cover including the top wall 22 may be spray painted or masked as at 44 such that all the areas of the cover are rendered invisible except for a portion or opening 46 directly adjacent the register 32. Such area or opening 46 is shown as a square in the drawing but may be of any configuration so long as the register is visible therethrough. Thus if the register is circular, the opening could also be circular or the entire coating 44 could be not provided and he inside chamber completely or essentially visible through the top wall.

By mounting the gas index 30 directly in the chamber C, several advantages are accomplished. Initially, it should be pointed out that conventional indexes 30 normally have no parts which would be injured by gas or the normal components thereof. In fact, commercially produced or pipeline gas normally is very dry and thus any condensation that might creep into the meter will be withdrawn along with the gas flow therethrough. Thus the problem of condensation in prior art devices obscuring the register as through condensation is completely eliminated. In addition since the gas index 30 is housed within the gas chamber C, it renders such far more tamper resistant than indexes mounted in separate housings and thus reduces the chance of user tampering with the index. Another advantage of such mounting within the cover construction of the present invention is the reduction of conventional sealing parts necessary with positioning the index within a secondary housing. In other words, the index is far more secure from external intrusion whether than intrusion be from contamination through bugs, sand, and the like or purposeful tampering as from users.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A cover for a curb meter body comprising a one piece molded body of at least translucent plastic resinous material having a generally planar top wall, sidewalls downwardly dependent therefrom so as to define an interior chamber and means for attaching said cover to said meter body, means permitting gas flow to enter into and exit from said interior chamber and a gas index including gas flow measuring means and a register mounted on said body and directly in said interior chamber, said register directly visible from the outside of said cover through the top wall thereof.

2. The cover as set forth in claim 1 wherein said sidewalls downwardly extend from the periphery of said top wall.

3. The cover as set forth in claim 2, said gas inlet and said gas outlet provided in opposed sidewalls whereby gas enters from one side of said interior chamber passes through said chamber in contact with said gas flow measuring means.

4. The cover as set forth in claim 1, said gas inlet and said gas outlet provided in opposed sidewalls whereby gas entrs from one side of said interior chamber passes through said chamber in contact with said gas flow measuring means.

5. The cover as set forth in claim 2, said means for attaching said cover to said body including a peripheral flange laterally extending from the lower terminus of said sidewalls.

6. The cover as set forth in claim 1, said index directly attached to the inside of said top wall with said register in face to face disposition with portions of said top wall inside.

7. The cover as set forth in claim 1, said cover body having a masking layer disposed over the interior surfaces thereof except for a central area in said top wall wherein said register is visible therethrough.

8. The cover as set forth in claim 6, said cover body having a masking layer disposed over the interior surfaces thereof except for a central area in said top wall wherein said register is visible therethrough.

* * * * *